United States Patent [19]

Lee et al.

[11] Patent Number: 4,982,762

[45] Date of Patent: Jan. 8, 1991

[54] HYDRAULIC LIFT WITH WEIGHT TRANSFER

[75] Inventors: Michael C. Lee; Robert N. Behrens, both of Beaver Dam; Dale R. Dobberpuhl, Horicon; Lloyd A. Wykhuis, Mayville, all of Wis.; Dix S. Montogomery, St. Charles, Ill.

[73] Assignee: Deere & Company, Moline, Ill.

[21] Appl. No.: 478,336

[22] Filed: Feb. 12, 1990

Related U.S. Application Data

[62] Division of Ser. No. 324,364, Mar. 15, 1989, Pat. No. 4,920,732.

[51] Int. Cl.⁵ .............................................. F16K 1/04
[52] U.S. Cl. .................................. 137/614.17; 251/122
[58] Field of Search ........................ 157/614.17, 614.18, 157/614.19; 251/121, 122; 60/466, 470

[56] References Cited

U.S. PATENT DOCUMENTS

| | | | |
|---|---|---|---|
| 2,821,996 | 2/1958 | Stevenson | 137/490 |
| 3,511,470 | 5/1970 | Beckett et al. | 251/121 |
| 4,004,610 | 1/1977 | Theriot | 137/614.17 |
| 4,064,908 | 12/1977 | Loe | 137/614.17 |
| 4,248,265 | 2/1981 | Freeman, Jr. | 137/614.17 X |
| 4,292,884 | 10/1981 | Schmacher et al. | 91/446 X |
| 4,313,466 | 2/1982 | Adams | 137/614.17 |
| 4,329,911 | 5/1982 | Schwerin | 172/7 X |
| 4,457,341 | 7/1984 | Aspinwall | 137/614.17 X |
| 4,463,658 | 8/1984 | Heiser et al. | 172/7 X |
| 4,622,803 | 11/1986 | Lech | 172/9 X |
| 4,733,523 | 3/1988 | Dedeyne et al. | 56/10.2 |

Primary Examiner—John C. Fox

[57] ABSTRACT

Lift structure particularly useful with front mounted implements for providing both lift and weight transfer functions from a single valve. The valve acts as an adjustable bleeder for the lift cylinder and includes a control knob which is movable both axially and rotationally to respectively provide lift and adjustable flotation. The valve is normally biased to an adjustable orifice position for operating the implement in a lowered, flotation position. To momentarily lift the implement, the operator moves the control knob against the bias to direct flow to the lift cylinder thereby raising the implement off the ground. When the operator releases the valve, it automatically returns to the preset orifice position to provide the desired flotation.

6 Claims, 1 Drawing Sheet

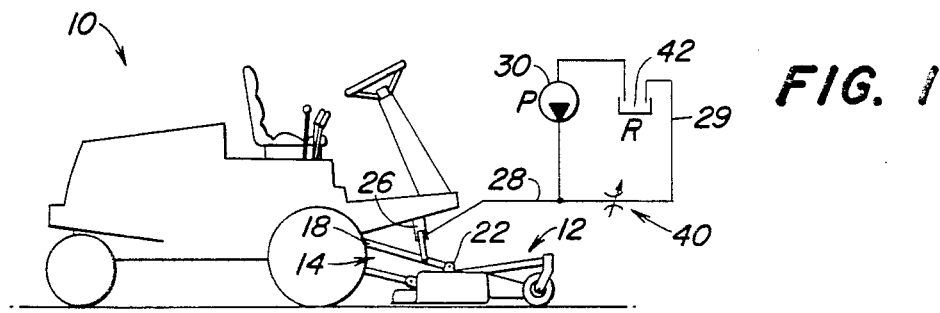
FIG. 1
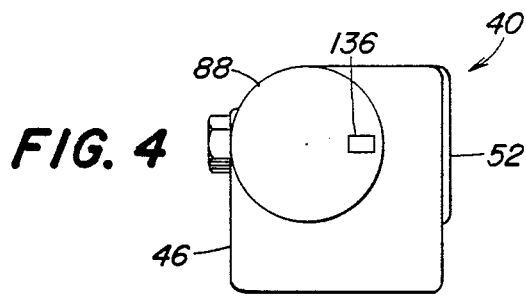
FIG. 4
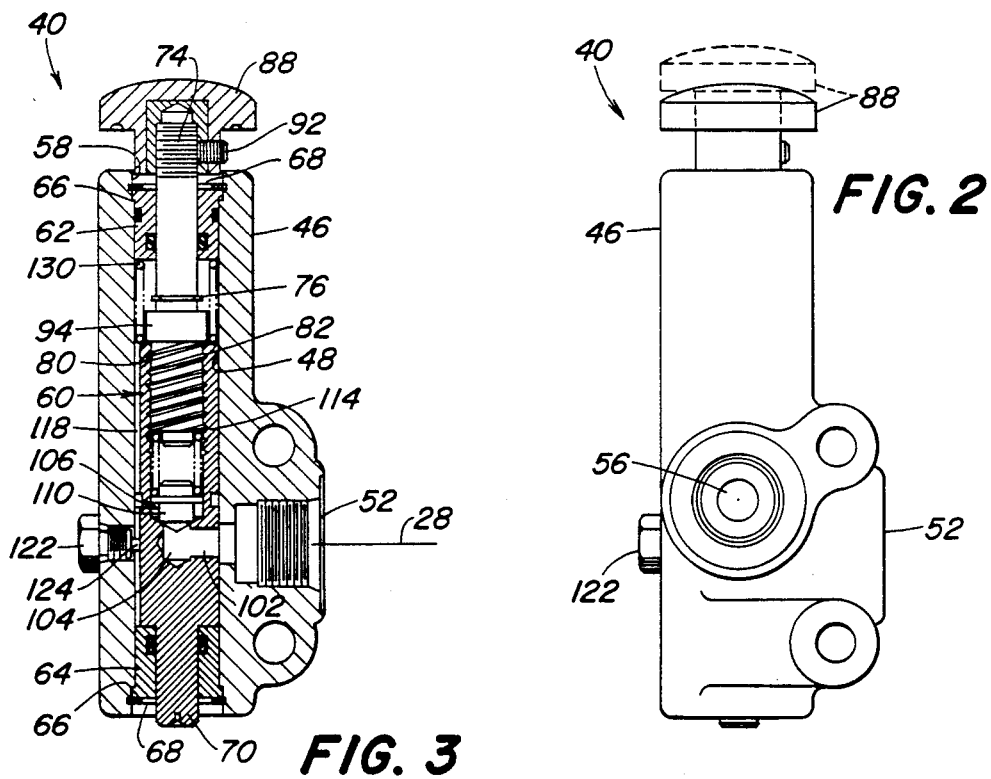
FIG. 2
FIG. 3

HYDRAULIC LIFT WITH WEIGHT TRANSFER

This application is a division of application Ser. No. 07/324,364, filed 15 Mar. 1989, Now U.S. Pat. No. 4,920,732.

ASSIGNMENT

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill., 61265, U.S.A., together with all rights to file, and to claim priorities in connection with, corresponding patent applications in any and all foreign countries in the name of Deere & Company or otherwise.

BACKGROUND OF THE INVENTION

The present invention relates generally to hydraulic lift systems, and more specifically to a hydraulic lift system including an adjustable valve operable for both hydraulic lift and hydraulic weight transfer functions.

Machines such as, for example, a front-mounted mower utilize both a lift system to raise and lower an implement relative to a vehicle and a mechanical or hydraulic device to transfer weight from the implement to the vehicle during operation. Some machines utilize chains, cables or springs, or a combination thereof, to provide weight transfer. With some front-mounted mower arrangements, an extension spring is attached to the frame of the vehicle and to the implement to transfer implement weight onto the vehicle drive wheels for better traction and to reduce the implement weight on the ground for better flotation. Other structures include a torsion spring mounted on the pivot axis of push arms which are connected to the implement to transfer implement weight to the vehicle drive wheels.

Another weight transfer arrangement which is utilized on presently available John Deere front-mounted mowers includes a weight transfer valve providing an adjustable flow restriction downstream from the operator control valve connected to the hydraulic lift cylinders. By rotating the weight transfer valve, the flow restriction is adjusted to provide a preselected charge pressure to the lift cylinder which, in turn, provides the desired lift for transferring the weight of the implement to the vehicle drive wheels.

The mechanical weight transfer devices require exterior hardware which detracts from the appearance of the vehicle. Mounting brackets are also needed with the mechanical devices, and the implement lift force can vary substantially as the implement goes up and down over the terrain. The adjustment of the lift force with mechanical devices can also be difficult and non-precise.

Although the hydraulic system for transferring weight is relatively more compact and easier to adjust than the mechanical systems, two valves have been necessary to provide both the adjustable weight transfer function and the lift function. The additional valve significantly increases the cost and complexity of the hydraulic system. In addition, presently available weight transfer valves permit the operator to conveniently lift the implement from the ground and maintain the implement in the lifted position rather than following the recommended procedure of maintaining the implement at least partially supported on the ground for increased machine stability. Although the lift or full float position is required on the weight transfer valve to give the operator the capability to climb a curb or small hill or to load the implement onto a trailer, costly ballast is required on the machine to counterbalance the weight of the implement when it is transported in the float position against recommended procedures.

BRIEF DESCRIPTION OF THE INVENTION

It is therefore an object of the present invention to provide an improved lift cylinder structure for providing weight transfer and full lift functions. It is another object to provide such a structure which overcomes the aforementioned problems. It is yet another object of the invention to provide such a structure which is easy to adjust, provides uniform flotation over ground variations, and gives the operator the capability of climbing a curb, small hill or trailer ramp while encouraging operation in a partial flotation mode during transport.

It is still another object of the present invention to provide an improved lift cylinder structure with both weight transfer and lift function capabilities. It is a further object to provide such a structure which is more compact and substantially less costly than most previously available weight transfer and lift systems. It is a further object to provide such a structure wherein weight transfer is easily adjustable and wherein the operator has the option of momentarily providing full flotation, with automatic return to the preset flotation position. It is a further object to provide such a structure wherein full flotation is provided only when the operator positions the valve against a bias and holds it in that position, thereby discouraging the operator from continuous operation of the machine in the full float position.

It is still a further object of the present invention to provide an improved control valve for a lift cylinder structure which provides a weight transfer function. It is another object to provide such a valve with a control which is movable both axially and rotationally to provide adjustable weight transfer and full lift capabilities in a single valve structure. It is another object to provide such a valve which is biased toward a preselected weight transfer position but is movable against the bias to a full lift position. It is another object to provide such a valve which automatically returns to the preselected weight transfer position when the operator releases the valve.

It is still another object of the present invention to provide an improved control valve for a lift cylinder structure which provides an easily adjustable weight transfer function as well as a momentary full lift or full float capability. It is a further object to provide such a valve which utilizes both rotational and axial movement from a single control point to adjust the weight transfer and provide the lift capability.

In accordance with the above objects, a hydraulic system for a vehicle having an implement mounted for vertical movement thereon includes a lift cylinder connected between the vehicle and the implement and a single control valve connected downstream of the lift cylinder for adjustably restricting flow from the cylinder in a closed center hydraulic system. The valve acts as a bleeder for the lift cylinder and includes a control knob which is rotatable to adjust the amount of restriction which, in turn, determines the amount of weight transfer from the implement to the vehicle provided by the lift cylinder. The knob is also movable axially against the bias of a spring to direct hydraulic fluid flow to the lift cylinder to lift the implement. To maintain the implement in the fully lifted or full float position, the operator must hold the knob against the bias. Releasing the knob returns the valve to the weight transfer position wherein the implement is lowered to the ground with the predetermined amount of weight transfer provided. The bias helps assure that the operator will operate the machine with the implement lowered. When it is necessary to move the implement to the full float condition, the operator may do so by moving the knob in the axial direction.

The valve includes a valve body having a central bore with an inlet port located at the lower end of the bore and an outlet port offset slightly above the inlet port. A plunger assembly is slidably received within the valve bore and is biased by a spring to a normal operating position wherein an inlet to a poppet opens into the inlet port and an outlet to the poppet opens into the output port. The poppet provides an adjustable restriction to fluid flow through the valve. A spring normally biases the poppet toward a restricted position, and the tension of the spring is adjustable by rotating the valve control knob. By rotating the knob in one direction, the tension on the spring is relieved to let the poppet move away from the inlet port and thereby create less restriction to hydraulic fluid flow so that less weight is transferred from the implement to the vehicle. Rotating the knob in the opposite direction increases the spring tension and forces the poppet back into the orifice to create full weight transfer. When the plunger assembly is pulled upwardly, the inlet of the poppet no longer aligns with the inlet port to thereby block off all flow of fluid through the valve. With the valve blocked, all of the fluid flow is directed to the lift cylinder to raise the implement relative to the vehicle. The plunger assembly is biased to the normal operating position with sufficient force to discourage the operator from operating the vehicle with the implement in the fully raised position. When the knob is released, the valve returns to the preselected adjusted position to provide the desired implement flotation.

The lift cylinder structure is relatively simple and compact in construction and eliminates multiple valves. Flotation adjustments may be made quickly and precisely. The lift force on the implement remains constant even over irregular ground surfaces to provide predictable implement flotation. The lift force can be easily adjusted to accommodate changes in terrain, conditions and operating speeds. Unsightly exterior hardware is eliminated. The valve encourages the operator to operate the machine with the implement lowered to the ground in a partial flotation condition. It also gives him the capability of momentarily providing full float for climbing a curb, hill or loading ramp.

These and other objects, features and advantages of the present invention will become apparent to those skilled in the art from the description which follows and from the drawings.

BRIEF DESCRIPTION OF THE DRAWINGS

FIG. 1 is a side view of a vehicle with an implement attached thereto and with the lift cylinder structure of the present invention indicated schematically.

FIG. 2 is a rear view of a control valve constructed in accordance with the teachings of the present invention.

FIG. 3 is a sectional view of the control valve of FIG. 2.

FIG. 4 is a top view of the valve of FIG. 2.

DESCRIPTION OF THE PREFERRED EMBODIMENT

Referring to FIG. 1, there is shown a vehicle 10 having an implement 12 connected to the front end thereof by lift system 14. The lift system 14 includes lift arms 18 pivotally connected to the forward end of the vehicle frame and extending forwardly therefrom to a connection at 22 with the implement 12. A hydraulic lift cylinder 26 has a base end connected to the frame of the vehicle 10 and a rod end connected to the lift system 14. The device is shown as a front-mounted mower, although it is to be understood that the lift structure of the present invention may also be utilized with other types of equipment.

The lift cylinder 26 is connected by a line 28 to the output of a source of hydraulic fluid under pressure 30 located on the vehicle 10. An adjustable operator control valve 40 is connected between the line 28 and a reservoir 42 by a line 29.

The valve 40 adjustably bleeds fluid flow from the lift cylinder 26 to adjust the cylinder pressure which tends to rotate the lift arms 18 upwardly about their pivotal connections with the vehicle 10. The valve 40 preferably is supported by the instrument panel housing of the vehicle and includes a single control movable in two different directions, as will be described in detail below, to provide both weight transfer of the implement 12 to the vehicle 10, and a short-term full lift or full flotation function wherein flow from the cylinder 26 is substantially blocked so that the cylinder lifts the implement 12 to the fully raised position. Movement of the control in one of the directions adjusts the amount of restriction to fluid flow from the cylinder 26 to reservoir to thereby adjust the amount of weight transfer provided during normal operation of the implement 12. Movement of the control in a second direction blocks substantially all flow through the valve thus directing hydraulic fluid into the lift cylinder 26 to thereby rotate the lift arms 18 upwardly and raise the implement 12 from the ground. Preferably, the valve 40 is heavily biased toward the flotation position, and the full lift function is only provided when the operator holds the control against the bias.

Referring now to FIGS. 2-4, the construction of the valve 40 will be discussed in detail. In the embodiment shown, the valve 40 includes a valve body 46 having a central bore 48 with an inlet port 52 opening radially into the lower central portion of the bore 48 and connected to the line 28. An outlet port 56 connected to the line 29 extends radially from the central bore 48 on the back side of the valve body 46 (FIG. 2) at a location offset slightly above the port 52.

A valve spool or plunger assembly 60 (FIG. 3) is slidably received within the central bore 48 and is supported and retained therein by sealed bearing assemblies 62 and 64 located at the upper and lower ends, respectively, of the valve body 46. The ends of the central bore 48 are slightly enlarged to receive shoulders 66 located on the bearing assemblies 62 and 64. Snap rings 68 secure the bearing assemblies in position. The lower end of the spool 60 includes a reduced diameter portion 70 slidably received in and sealed by the lower bearing assembly 64. A threaded shaft 74 projects upwardly from the upper end of the spool 60 through the center of the upper bearing assembly 62 and out beyond the upper end of the valve body 46. The lower bearing assembly 64 prevents movement of the spool 60 downwardly beyond the normal operating position shown in FIG. 3. A retaining ring 76 is secured to the shaft 74 and contacts the lower end of the upper bearing assembly 62 to limit upward movement of the spool 60.

The upper end of the spool 60 is internally threaded at 80, and an adjusting member 82 is threaded into the spool 60. The lower end of the threaded shaft 74 is fixed to the member 82. A control knob 88 is threaded onto the upper end of the shaft 74 and secured thereon by a set screw 92. By rotating the control knob 88 in the clockwise direction, the adjusting member 82 is threaded downwardly into the upper end of the spool 60. Rotation in the opposite direction moves the member 82 upwardly relative to the spool 60. A stop collar 94 is fixed to the upper end of the spool 60. The ring 76 contacts the collar 94 to limit the distance that the member 82 can be threaded downwardly. The top of the member 82 abuts against the bottom of the collar 94 to limit the upward unthreading of the member 82.

The control end of the spool 60 includes a radially extending bore 102 which aligns with the inlet port 52 when the valve is in the normal operating position as shown in FIG. 3 and by the solid lines in FIG. 2. An axial bore 104 opens upwardly from the bore 102 into variable orifice structure indicated generally at 106 which, as shown in FIG. 3, includes a poppet 110 with an inlet opening downwardly into the bore 104 and an outlet aligned with the outlet port 56. The poppet 110 is biased toward a closed position by a tension spring 114 which is compressed between the poppet 110 and the lower end of the adjusting member 82. Therefore, one can see as the control knob 88 is rotated in the clockwise direction to move the adjusting member 82 downwardly, the force of the spring 114 acting downwardly on the poppet 110 increases and to increase the restriction to fluid flow from the inlet port 52 through the valve to the outlet port 56. Rotating the control knob 88 in the opposite direction relieves the pressure of the spring 114 and lets the poppet 110 move away from the inlet to create less restriction to fluid flow through the valve.

To prevent rotation of the spool 60 within the central bore 48 of the valve, a longitudinal groove 118 is formed in the surface of the spool, and a plug assembly 122 threaded into an aperture opposite the inlet port 52 includes a projection 124 which is received within the groove 118. The groove 118 and plug assembly 122 permit axial movement of the spool 60 while preventing relative rotation between the spool and the valve body.

A compression spring 130 encircles the lower end of the threaded shaft 74 and is compressed between the lower end of the bearing assembly 62 and the upper end of the spool 60 to bias the spool downwardly toward the position shown in FIG. 3 wherein the inlet port 52 is aligned with the bore 102. By pulling on the knob 88 in the upward direction (broken lines, FIG. 2), the spool 60 is pulled upwardly against the bias of the spring 130 until the bore 102 is completely out of alignment with the inlet port 52 and the spool completely blocks the inlet port. Contact between the ring 76 and the bearing assembly 62 limits upward axial movement of the spool 60. When the inlet port 52 is blocked, fluid flow through the valve is completely cut off so that all of the flow from the pump 30 is directed through the line 28 into the lift cylinder 26 to raise the implement 12 from the ground. When the control knob 88 is released, the spring 130 biases the spool 60 back to the normal operating position wherein the preselected amount of flotation determined by the rotational position of the control knob 88 is provided, and the implement returns to ground contact with some of the weight of the implement being transferred to the vehicle 10. If more flotation is desired, the operator simply rotates the knob 88 in the clockwise direction to compress the spring 114 and force the poppet 110 downwardly. If less flotation is desired, the operator rotates the knob 88 in the counterclockwise direction to relieve spring pressure which in turn lets the poppet 110 move away from the inlet port to create less restriction so that more fluid is bled from the cylinder 26. A mark 136 (FIG. 4) is provided on the face of the knob 88 so that the operator has an indication of the orifice adjustment. The stop collar 94 limits the amount of knob rotation to slightly less than 360 degrees.

To adjust the restriction, the operator rotates the knob 102 until the desired amount of lift for the particular operating conditions of the vehicle is provided. Any time the operator wishes to momentarily lift the implement 12, for example, when he is climbing a curb or a small hill or loading the unit onto a trailer, he simply pulls the knob 88 to move the spool 60 axially and completely block fluid flow away from the cylinder 26. The cylinder then retracts completely to lift the arms 18 and the implement 12 to the fully raised position. Preferably, the effort required to lift the knob 88 is sufficient (approximately five to ten pounds or more) so that the operator will tend to operate the machine with the implement lowered to the more stable flotation position in contact with the ground. The range of orifice adjustment provided by rotating the knob 88 is insufficient to provide full lift to the implement 12 even at the maximum restricted position (wherein the ring 76 abuts against the top of the collar 94) when the valve is in the normal operating position.

Having described the preferred embodiment, it will be apparent that modifications can be made without departing from the scope of the invention as defined in the accompanying claims.

We claim:

1. A control valve for actuating a hydraulically operated lift structure to selectively provide a lift function and a weight transfer function, the valve comprising:
    a valve body having an inlet port and an outlet port;
    a plunger assembly slidably received within the valve body and including a control portion movable between a first position wherein fluid flow between the ports is substantially blocked, and a second position wherein flow between the ports is adjustably restricted;
    adjusting means rotatably received within the valve body including an element yielding biased toward a preselected restricting position, and means responsive to rotation of the adjusting means for varying the bias and changing the amount of restriction to flow between the ports when the plunger assembly is in the second position; and
    operator control means including a single control for moving the plunger assembly between the first and second positions and for selectively rotating the adjusting means.

2. The invention as set forth in claim 1 wherein the plunger assembly is slidable axially within the valve body, and means for biasing the plunger assembly toward the second position.

3. A control valve for actuating a hydraulically operated lift structure to selectively provide a lift function and a weight transfer function from a single control, the valve comprising:
- a valve body having an inlet port and an outlet port;
- a plunger assembly slidably received within the valve body and including a control portion movable between a first position wherein fluid flow between the ports is substantially blocked, and a second position wherein flow between the ports is adjustably restricted;
- means rotatably received within the valve body for adjusting the amount of restriction to flow between the ports when the plunger assembly is in the second position;
- operator control means for moving the plunger assembly axially within the valve body between the first and second positions and for selectively rotating the means for adjusting the amount of restriction, means for biasing the plunger assembly toward the second position, and
- wherein the operator control means comprises a single knob connected to the plunger assembly.

4. A control valve for actuating a hydraulically operated lift structure to selectively provide a lift function and a weight transfer function from a single control, the valve comprising:
- a valve body having an inlet port and an outlet port;
- a plunger assembly slidably received within the valve body and including a control portion movable between a first position wherein fluid flow between the ports is substantially blocked, and a second position wherein flow between the ports is adjustably restricted;
- means rotatably received within the valve body for adjusting the amount of restriction to flow between the ports when the plunger assembly is in the second position;
- operator control means for moving the plunger assembly between the first and second positions and for selectively rotating the means for adjusting the amount of restriction; and
- wherein the means for adjusting the amount of restriction comprises a poppet connected between the ports and a spring biasing the poppet to a restricted position, and means for varying the spring pressure.

5. The invention as set forth in claim 4 wherein the means for varying the spring pressure comprises a threaded member responsive to rotation of the operator control means for movement relative to the poppet, and wherein the spring comprises a coil spring compressed between the poppet and the threaded member.

6. The invention as set forth in claim 5 wherein the plunger assembly includes a control portion having an opening aligning with one of the ports when the assembly is in the second position and wherein the poppet and spring are supported within the plunger assembly.

* * * * *